United States Patent

Barkovitz et al.

[15] 3,664,094
[45] May 23, 1972

[54] FLOW BALANCING RESTRICTION IN GAS SCRUBBER

[72] Inventors: William E. Barkovitz, Lincoln Park; Julius V. Przygocki, Trenton, both of Mich.

[73] Assignee: American Standard Inc., New York, N.Y.

[22] Filed: July 27, 1970

[21] Appl. No.: 58,485

[52] U.S. Cl. .................................. 55/223, 55/227, 55/228, 55/233, 55/241, 55/257, 261/94, 261/95, 261/109, 261/116, 261/117
[51] Int. Cl. ........................................................ B01d 45/00
[58] Field of Search .................... 55/223, 227, 228, 229, 233, 55/241, 257; 261/94–98, 108–112, 116, 117

[56] References Cited

UNITED STATES PATENTS 3,550,356  12/1970  Abboud ................................... 55/241

Primary Examiner—Tim R. Miles
Assistant Examiner—Steven H. Markowitz
Attorney—John E. McRae, Tennes I. Erstad and Robert G. Crooks

[57] ABSTRACT

A wet dust collector or scrubber having an inertial separator section for removing a substantial percentage of the dust particles from the treated gas stream, a porous packing subjected to flushing liquid for producing a concentrated fog and assimilating the remaining dust particles into said fog, and a second separator section for removing the wet dust particles from the gas stream. The first inertial section preferably includes a special flow-limiting nozzle which exerts a balancing pressure drop on the flow of separated dust particles so that proper particle separator flows are achieved in the first inertial section.

9 Claims, 7 Drawing Figures

Patented May 23, 1972
3,664,094
2 Sheets-Sheet 1
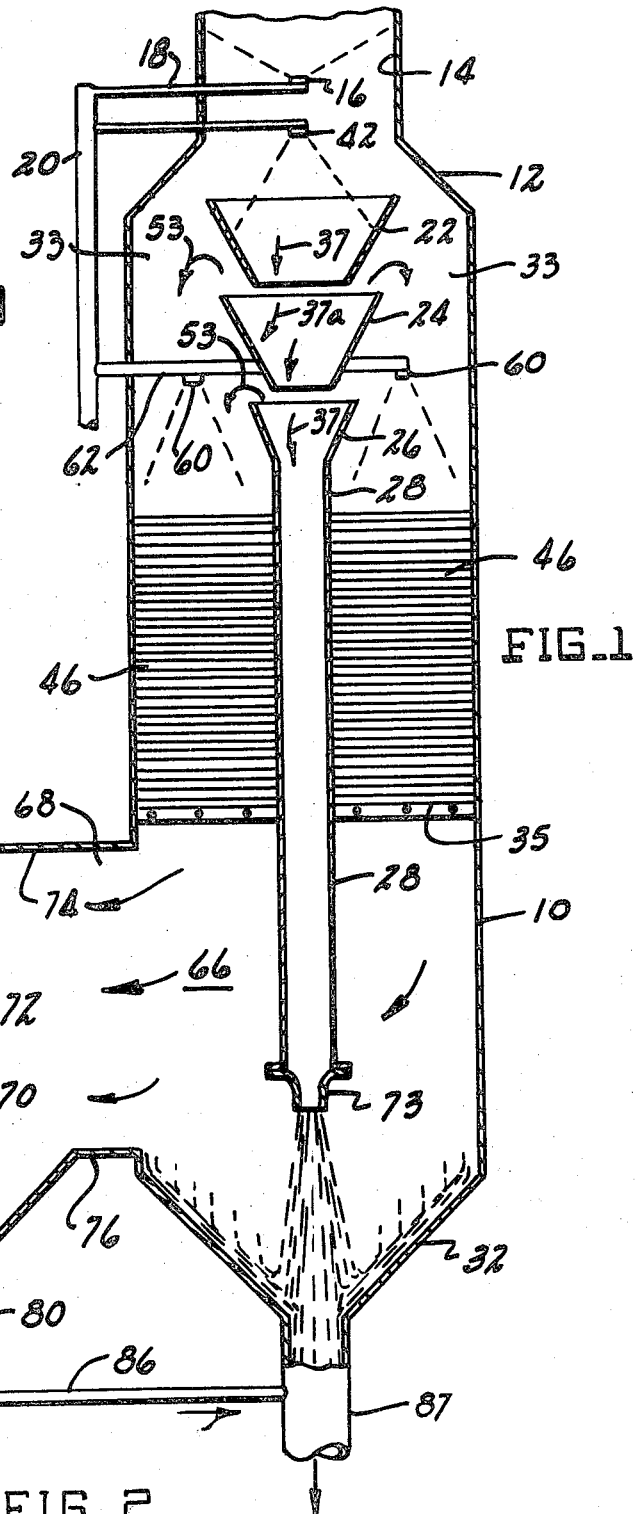
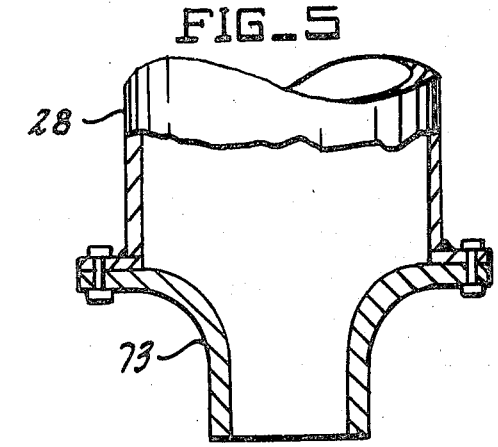
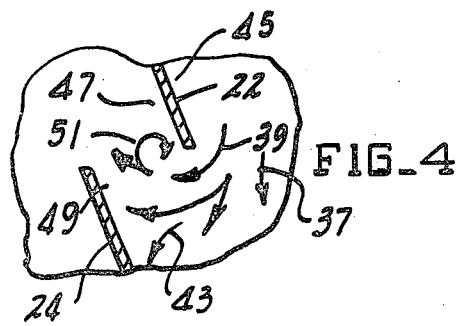
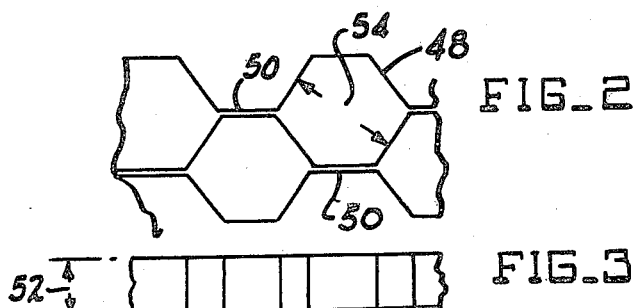
INVENTORS
JULIUS PRZYGOCKI
WILLIAM E. BARKOVITZ Patented May 23, 1972
3,664,094
2 Sheets-Sheet 2
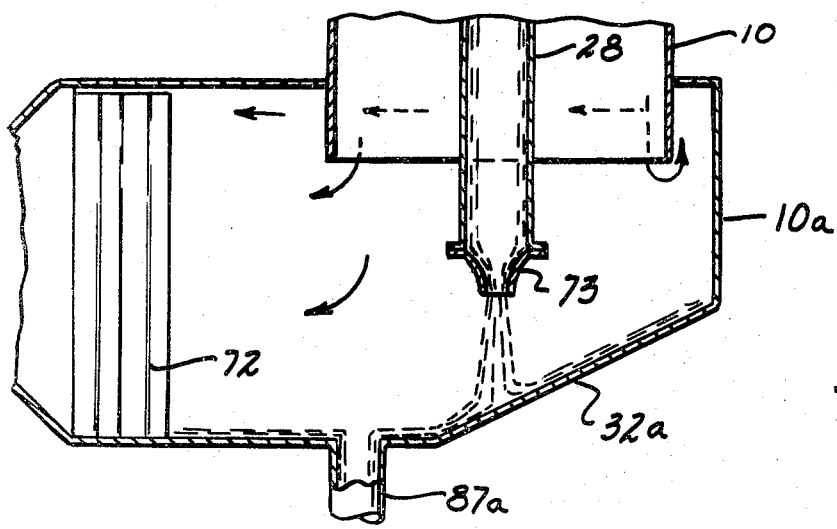
FIG_6
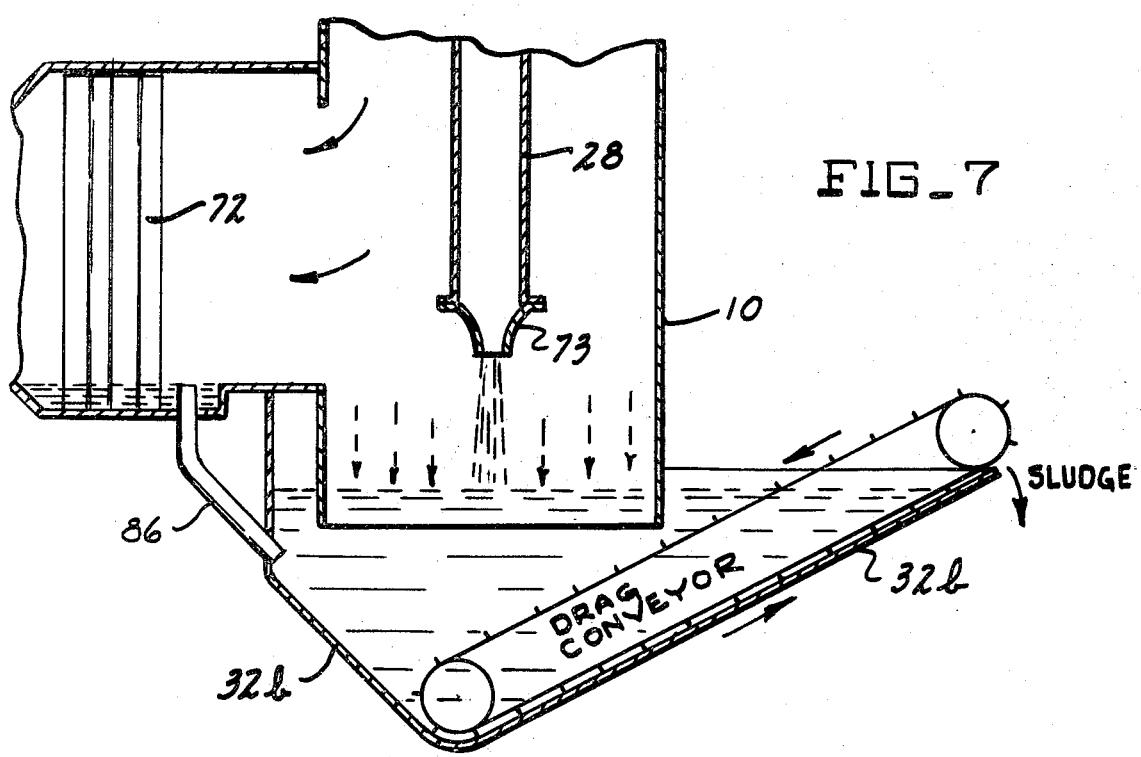
FIG_7
INVENTORS
JULIUS PRZYGOCKI
WILLIAM E. BARKOVITZ

FLOW BALANCING RESTRICTION IN GAS SCRUBBER

THE DRAWINGS

FIG. 1 is a sectional view taken through an upright cylindrical dust collector built according to the invention.

FIG. 2 is an enlarged plan view of a porous packing employed in the FIG. 1 embodiment.

FIG. 3 is a side elevational view of the FIG. 3 packing.

FIGS. 4 and 5 are enlarged sectional views of structural details used in the FIG. 1 device.

FIGS. 6 and 7 illustrate other embodiments of the invention.

FIG. 1 GENERAL ARRANGEMENT

The illustrated collector is generally similar to the collector shown in copending U.S. Pat. application, Ser. No. 869,066 filed Oct. 24, 1969. As shown in attached FIG. 1 the collector comprises an upright cylindrical casing 10 having an inlet 14 in its upper end for receiving the downflowing dusty gas stream by draw-through action. As the gas flows downwardly through the inlet 14 it is conditioned by liquid (water) from an upwardly directed spray nozzle 16; the liquid controls temperature and increases the mass of the entrained dust particles. Subsequently the wet gas traverses a first inertial separator section defined by three (or more) conical baffles or cones 22, 24 and 26 flushed with liquid from a downwardly directed nozzle 42. A substantial percentage of the dust particles are driven by inertial action into the cones and thence through a vertical tube 28 to a discharge hopper 32. The gas and lighter dust particles reverse directions twice and flow down around the outside of the cones, as at 53. The combination of various actions, including cone deflections, agglomeration by the water sprays, flushing of the wet surfaces, multiple venturi effects, and the tortuous gas flow, removes most of the dust from the gas stream.

Partially cleaned gas escaping to space 33 flows downwardly through a packing 46 which is subjected to flushing liquid sprays from overhead nozzle 60. The liquid and gas flow together down through the cellular packing. During this downflow travel the packing edge surfaces produce multiple shearing actions on the liquid droplets, atomizing and breaking them into tinier droplets akin to fog. The impaction of the dust and fog coats and/or saturates the finer dust particles so that by the time the stream flows out through the lower face 35 of the packing the dust particles have a substantially greater mass than when they first entered the packing. The packing surfaces exert frictional forces on the heavier liquid-dirt agglomerates so that these agglomerates are moving at a slower velocity than the air particles when the composite stream exits from the packing.

An outlet opening 68 is arranged at right angles to the flow direction taken by the stream coming out of the packing. Consequently the stream is forced to make an abrupt directional change as it seeks the outlet opening. During this directional change many of the still entrained wetted dust particles are driven into the hopper 32 by inertial action. Some of the wetted dust particles remote from outlet opening 68 may deposit in the hopper by gravity action.

It will be seen that the general arrangement involves a wetting of the gas stream by nozzle 16, a first inertial separation of wetted dust particles by the cones, the production of a fine water mist or fog and wetted surfaces packing 46, and a second separation of wetted dust particles as the gas flows through outlet opening 68.

CONES 22, 24, 26

Spray nozzle 16 is suitably connected to a water supply pipe 18 which extends from a main water pipe 20. Nozzle 16 preferably delivers a wide conical stream of water into the inlet so that substantially all of the downflowing gas is required to pass through the sprayed liquid. As the dust contacts the liquid, the entrained dust particles are coated with or enveloped in liquid particles, thereby effectively increasing the mass of each particle in the gas stream. The cones 22, 24 and 26 are supported by struts or rods (not shown) so that gas flowing downwardly into the cones can pass laterally and outwardly through the annular spaces between the cones and the casing side wall.

As the gas flows downwardly through the cones it undergoes certain directional changes. Some of the gas flows between the upper edge of cone 22 and the frustro-conical casing wall 12; some of the gas flows downwardly through the cone 22 and thence laterally through the annular space between cones 22 and 24; some of the gas flows downwardly through cone 24 and thence laterally through the annular space between cones 24 and 26; some gas, containing concentrated dust, flows downwardly through tube 28 and into hopper 32.

As seen from FIG. 1, the spray from nozzle 42 contacts cone 22 well above its lower edge. The quantity of spray water varies according to the size of collector and character of dust; in a collector handling 10,000 c.f.m. gas good washing action has been achieved with a nozzle delivering about 3.5 gallons per minute water flow. The liquid from nozzle 42 tends to follow down the inner surface of the cone as denoted by numeral 45 in FIG. 4. Much of this liquid is entrained by the arrow 39 stream as the liquid leaves the lower edge of the cone. The action is such as to produce considerable turbulence which promotes assimilation of the dust particles into the arrow 39 stream. The turn out of stream 39 as shown in FIG. 4 produces a separation between the turning stream and the central stream 37 so that the central stream itself is drawn outwardly to impact on the next cone 24, as at 37a (FIG. 1).

The arrow 39 fluid stream (FIG. 4) is not able to completely fill the annular space between the lower edge of cone 22 and the upper edge of cone 24. The fluid tends to fill zone 49 adjacent the edge of cone 24 and to leave a void zone 47 near the surface of cone 22. Concentration of the stream in zone 49 produces increased fluid velocities in that zone. The very minimal velocities in zone 47 coupled with the high velocities in zone 49 produce a differential velocity in the adjacent boundary layers which causes vortical turbulence, as denoted by arrow 51. Such vortices are useful in mixing water and air droplets together to provide heavy agglomerates. Localized turbulence provides impaction between the dust and water droplets which breaks the surface tension and promotes assimilation of the dust into the droplets. Some of the arrow 45 water manages to flow or be thrown downwardly against the inner surface of cone 24. Such water is able to flush particles which have impacted the cone at 43. Ultimately some of the downflowing stream reaches the tube 28 (FIG. 1).

It will be seen from FIG. 1 that the fast-moving stream issuing from zone 49 (FIG. 4) has an upward component in the general direction of conical wall surface 12. The gas particles undergo a second directional change as denoted by numeral 53. Some of the heavier dust-water agglomerates continue on toward the casing wall 12 and impinge against wall 12 or against cylindrical wall 10. The fluid stream flowing downwardly from the space between cone 22 and wall 12 tends to flush these separated agglomerates down the wall 10 surface into packing 46.

The action taking place between cones 22 and 24 is repeated between cones 24 and 26 so that the fluid stream flowing downwardly through tube 28 has a fairly heavy concentration of agglomerated dust particles and flush water. The system of cones therefore functions as a primary separation stage for removing a substantial percentage of the dust in the stream supplied through inlet duct 14.

POROUS PACKING 46

The partially cleaned gas passing into space 33 is caused to flow downwardly through a porous packing 46 which is preferably comprised of a multiplicity of layers of honeycomb or egg crate material. As shown in FIG. 2, a representative layer may be formed of sinuous strips of material 48 arranged so that face areas 50 on adjacent strips are facially engaged and adhered to one another. The individual strips 48 are preferably thin gauge material, as for example 0.004 to 0.010 inch thick. Suitable materials are sheet metals such as aluminum, resin-impregnated wood fiber, plastic such as polyvinyl chloride, or resin-impregnated asbestos.

Preferably the strips 48 have a vertical dimension 52 less than one-half inch, as for example one-quarter inch. The lateral or dimetrical dimension of each cell is preferably on the order of three-eighth to one-half inch as denoted by dimension 54 in FIG. 2. The packing 46 is formed by stacking the individual cellular structures on one another at random to build up multiple layers, as for example 100 layers; each layer provides multiple shearing edges facing the oncoming gas-dust water stream. Assuming a vertical dimension 52 of one-quarter inch, and a packing composed of 100 layers, the total packing depth would be 25 inches.

The packing preferably fills the entire annular space between tube 28 and casing 10. The packing therefore can be split on the diameter of the casing into two pie shaped sections. Loading of the packing may be accomplished through an opening (not shown) in the casing 10 side wall.

Packing 46 may be flushed with liquid by means of four or more spray nozzles 60 depending from a water manifold pipe 62. The aim is to provide a mass of liquid evenly across the upper face of the packing so that each of the cells is flooded with a down flowing mass of liquid. The quantity of flooding liquid is determined largely by the depth of packing 46 and the character of dust. In a representative collector flooding at a rate of about 4 gallons per square foot of media face area has been used. The cells in successive packing layers preferably are laterally offset from one another so that liquid flowing from each cell is caused to strike the thin upper edge of the strip 48 in the next lowermost layer. The upper or leading edges of the various strips 48 produce a shearing action on the downflowing water droplets, thereby breaking or atomizing the larger droplets into extremely fine droplets something akin to a fog and providing a wetted packing surface. Fine dust particles in the gas stream are coated or agglomerated into the fog to thus increase their mass. Gaseous or sub-micron particles are believed to be transferred into the wetted films on the packing surfaces by absorption or mass transfer processes.

Assuming a casing 10 diameter of about 3 feet and a cell width of three-eighth inch, each packing layer would present perhaps 30,000 cutting edges to the oncoming fluid stream. A total packing depth of 100 layers would then mean a total number of cutting edges somewhere near 3,000,000. Lower edges of the cell walls might also perform some droplet cutting during turbulent motions of the droplets.

The cell openings in packing 46 preferably have a fairly small hydraulic radius for attainment of as many shearing edges as possible. Small cell opening sizes would normally present clogging difficulties. However, with the illustrated collector of the majority of the dust particles are removed by the aforementioned baffle cones, so that only fine dust particles reach the packing 46. Therefore clogging should not be a problem.

It is believed that the gas particles will have a higher linear velocity than the dust or water while the stream is flowing through the packing; this is because the gas is able to proceed through the packing pores with lessened inertia and deflection than the water or dust. Velocity differentials between the gas and the solid or liquid particles will produce some turbulent vortices which will further promote solid-liquid mixing. It is also believed that the solid-liquid particles will be slowed by frictional interaction with the side surface areas of the cell walls 48.

The general action of the cellular packing is believed to be an agglomeration of the dust particles and water particles, and a deceleration of the agglomerates relative to the gas particles.

SECOND SEPARATOR STAGE

As the stream containing the agglomerated dust flows into the space 66 below the packing 46 it is forced to turn 90° and move through a gas outlet opening 68 in the side wall of cylinder 10. The change in direction of the gas stream causes the relatively heavy wetted dust particles to be deposited in hopper 32 by inertial separator action.

Preferably the packing 46 does not retain any of the dust particles; its function is to finely atomize the liquid droplets, to assimilate the fine dust particles into the atomized fog atmosphere which is developed, and to provide wetted surface for collection and disposal of droplets. Removal of dust particles is accomplished by the directional changes of the gas as it moves toward outlet opening 68.

DROPLET ELIMINATION

Substantially clean gas flows through opening 68 and a droplet eliminator 72. Eliminator 72 may comprise a series of upright thin metal plates having sinuous contours formed by vertical bends 78. The plates may be suspended from their upper edges or otherwise supported to provide predetermined spacings between adjacent plates, such that the gas and any entrained droplets take sinuous paths through the eliminator section. Droplets collect in the vertical pockets formed by the bends 78 and eventually run down into a drain pan 80. A pipe 86 delivers the liquid to the drainage pipe 87 for hopper 32. The clean gas is discharged through opening 88 by any suitable gas-moving device (not shown).

GAS FLOW PROPORTIONING

It will be seen that in this collector the dust is separated from the flowing stream in two stages, i.e. in the cones 22, 24 and 26, and as the gas turns into outlet opening 68. In order for the cones to function as dust separators it is necessary that resistances to gas flow be such as will promote high flow values for both the turning stream(s) 39 and the dust-concentrated stream(s) 43. If the flow resistance presented to the turning stream is too large a disproportionate fraction of the gas will flow downward through tube 28, and the cones will achieve little dust concentration; tube 28 will then act largely as a bypass around packing 46 so that the gas issuing from the tube's lower end will be apt to eddy indiscriminately within hopper 32 and be drawn through outlet 68 without being cleaned. If the flow resistance presented to stream 37 is too large a disproportionate fraction of the gas will be carried along with the turning stream(s) 39; the velocity of the dust particles in the separated stream(s) 43 will then be so low that separated particles will be apt to be reentrained into the arrow 39 stream(s).

The resistance to flow of the turning stream(s) 39 is principally the resistance offered by packing 46. The resistance to flow of the dust-concentrate stream(s) 37 is largely the resistance offered by tube 28. In practice the packing 46 resistance will always be larger than the resistance of tube 28. Therefore we have provided a nozzle 73 at the tube lower end for increasing the tube resistance.

An illustrative construction wherein casing 10 has a diameter of about 3 feet might handle about 10,000 c.f.m. gas, under conditions in which the pressure difference between inlet 14 and outlet 68 might be on the order of 4 inches water gauge. The desired flow downward through tube 28 might be approximately 300 c.f.m. and the flow through packing 46 might be approximately 9,700 c.f.m.

Nozzle 73 is sized to contribute a significant flow resistance, the aim being to cause the effective driving forces for moving fluid through tube 28 to be proportionate to the forces tending to move the inlet gas through packing 46 so that optimum particle-separating flows are produced through the tube and through the packing. With a 6 inch diameter for tube 28 the nozzle 73 might have a diameter of about 2½ inches. With such a relationship the percentage of the total gas flowing through tube 28 is in the range of 1 to 3 percent, depending on the total c.f.m. Linear gas flows through tube 28 and packing 46 are intended to be approximately equal or in balance to the extent that linear flow in the tube is not appreciably greater than the packing 46 flow.

Flow velocity in tube 28 appreciably affects the performance of cones 22, 24 and 26. Each of the two cones 22 and 24 is a nozzle which acts to convert static head into velocity head as the fluid flows through the respective cone. The linear velocity increases as the fluid flows through each cone so that when the fluid leaves the cone its linear velocity may be three or four times the velocity it had when it entered the cone. Such high leaving velocities (on the order of 8,000 feet per minute), coupled with the short turning radius 39, promote separation of the dust out of the turning stream. In general the separating force increases directly as the square of the velocity and inversely as the turning radius. High velocities and sharp turning radii produce high separation efficiencies.

The high velocity condition in each turning stream 39 does not exist in the respective dust concentrate stream 43 because that stream is expanding to fill the subjacent cone and the void left by the departing stream 39, 53. However in order to make each cone handle some gas, and to prevent reentrainment of dust into stream 39 it is necessary that each dust concentrate stream 43 have some appreciable linear velocity in the direction of tube 28. With any given cone spacing the actual stream 43 velocity may be increased by lowering the resistance at 73 (substituting a nozzle having a larger orifice opening); the stream 43 velocity may be decreased by raising the resistance at 73. In general it is believed desirable to choose nozzles which limit the linear gas flow through tube 28 to values no more than 50 percent greater than the linear flow through packing 46.

It would be possible to effectively increase the flow resistance of tube 28 by merely using a smaller diameter tube (without any nozzle 73). However in that event the tube would under certain conditions tend to plug with solids. In practice the tube may have a diameter of about 6 inches, without plugging; nozzle 73 has an opening which is generally inversely proportional to the height of packing 46 (i.e. the flow resistance offered by the packing). In an illustrative case nozzle 73 would have an orifice diameter of about 2½ or 3 inches.

Preferably nozzle 73 is located at the extreme lower end of tube 28 in order to act as a positive spray nozzle for high velocity ejection of the water-dust agglomerates directly into the aligned pipe 87; in this manner the main gas stream moving toward opening 68 is unable to carry off any of the tube 28 discharge. In practice the discharge velocities from nozzle 73 are quite high; for example with velocities of 2,000 feet per minute in tube 28 the nozzle 73 velocity may be on the order of 8,000 feet per minute. The nozzle is preferably mounted on pipe 28 by detachable connections, as for example bolts, to permit field replacement with different sized nozzles in event it becomes desirable to change from the original selection, as when field conditions are not as originally contemplated. The packing layers 46 are removable and replaceable to permit different packing heights; similar replacement capability of nozzle 73 allows some field adjustment and also permits factory standardization of the single size tube 28 and single size circular cut-outs in the packing layers for fitting against the tube outer surface.

VENTURI SCRUBBING

The downward flow through tube 28 is comprised of gas, entrained dust particles, and liquid. As this mixture flows through nozzle 73 its linear velocity increases markedly such that very great turbulence is generated. The high turbulence tends to further assimilate the dust particles into the liquid films so that the gases discharging from the nozzle are scrubbed to a very great extent. The spacing between nozzle 73 and the surfaces of hopper 32 is such that the gases separate and escape through outlet 68 while the water-particle mixture is flushed into the hopper 32 and exit pipe 87.

The exact elevation of nozzle 73, (i.e. spacing above pipe 87) is not believed critical, the general considerations apparently being a sufficient spacing to allow escape of the tube 28 gas from the spray stream without appreciable scattering of the agglomerate spray pattern. Preferably nozzle 73 has a gradually constricting throat surface as shown in FIG. 5 for efficient conversion of static pressure to velocity pressure so as to promote water-dust mixing and high velocity discharge toward pipe 87.

It will be seen that the location of nozzle 73 at the discharge end of tube 28 (rather than at a point above the tube lower end) is advantageous in that a high discharge velocity precludes any carry off of the tube 28 dust-water agglomerates by the main gas stream flowing through space 66.

Preferably the nozzle 73 is in direct vertical alignment with pipe 87 to discharge a high percentage of agglomerated dust directly into the pipe. The surfaces of hopper 32 are preferably conical or sloping as shown in FIG. 1 in order to gravitationally assist the main flow of agglomerates and free water (separated out of the stream flowing through packing 46) into pipe 32.

FIG. 6

FIG. 1 illustrates a preferred construction for practicing the invention. FIG. 6 illustrates an alternate arrangement that might possibly be used with attainment of some of the advantages of the FIG. 1 construction. As shown in FIG. 6, the nozzle 73 discharges toward a flat sloping hopper surface 32a which leads to a drainage pipe 87a. The nozzle 73 is not in direct alignment with the drainage pipe; however the sloping surface 32a directs the high velocity stream into pipe 87a so that at least in some installations satisfactory disposal results may be achieved.

FIG. 7

FIG. 7 illustrates an embodiment of the invention wherein the nozzle 73 discharges into a liquid tank 32b having a drag conveyor for removal of sludge that gravitates toward the tank bottom.

We claim:

1. In a dust collector comprising means for wetting the treated gas stream; a first inertial separator means for removing wetted dust particles from the treated stream; a porous packing arranged to intercept the partially cleaned stream; means for applying flushing liquid to the packing, whereby the flushing liquid is intermixed with the flowing stream; and a second separator means arranged to remove liquid-coated particles from the stream flowing out the packing: the improvement comprising a discharge tube for conveying concentrated dust from the inertial separator means to a location downstream of said packing; and a restriction in the discharge tube for exerting a resistance to flow through the tube in proportion to the flow resistance of the aforementioned packing.

2. The collector of claim 1 wherein the restriction is located at the exit end of the tube.

3. The collector of claim 1 wherein the restriction consists of a flow nozzle having a gradually tapering inlet throat for efficient conversion of static pressure to velocity pressure.

4. The collector of claim 1 wherein the discharge tube takes the form of a vertical tube arranged for downflow discharge of wetted dust concentrate; said collector including a hopper having sloping surfaces leading to a drainage pipe; the exit end of said discharge tube being spaced above the hopper surfaces so that gas in the concentrated stream can separate out as the stream moves from the tube toward the hopper surfaces.

5. The collector of claim 4 wherein the discharge tube is in direct vertical alignment with the drainage pipe for direct spray of the concentrate into the pipe.

6. The collector of claim 4 wherein the exit end of the discharge tube is sufficiently close to the hopper surfaces that the dust concentrated stream has an appreciable velocity as it impacts against the hopper surfaces.

7. The collector of claim 1 wherein the first inertial separator means comprises a series of vertically spaced concentric cones arranged to confront the dusty gas in downflow relationship: the aforementioned discharge tube taking the form of a vertical tube depending from the lowermost cone; the tube restriction consisting of a nozzle arranged at the lower end of the tube for ejecting a high velocity stream of wetted dust concentrate downwardly from the tube.

8. The collector of claim 1 wherein the collector comprises an upright tubular casing having a top inlet for the gas stream to be treated; the first inertial separator means comprising a series of vertically spaced upright concentric cones arranged below the inlet to intercept the downflowing inlet stream; the aforementioned discharge tube being a vertical tube depending from the lowermost cone, and the aforementioned packing being disposed in the annular space between the tube and casing: the improvement further comprising a hopper-like casing bottom oriented for gravity discharge of liquid into a connected drainage pipe; said drainage pipe being in general axial alignment with the aforementioned discharge tube for directly receiving the tube flow; the aforementioned restriction comprising a nozzle carried at the lower end of the tube for directing a high velocity stream of wetted dust concentrate downwardly into the pipe.

9. The collector of claim 1 wherein the tube restriction comprises a flow nozzle arranged on the exit end of the tube to give the stream of wetted dust concentrate a relatively high velocity and venturi scrubbing action as it leaves the tube; said nozzle having a detachable connection with the tube to permit employment of different size nozzles with a given tube.

* * * * *